US012789210B2

(12) United States Patent

Langlois et al.

(10) Patent No.: US 12,789,210 B2

(45) Date of Patent: Nov. 10, 2026

(54) DUAL DISPENSER

(71) Applicant: APTAR FRANCE SAS, Le Neubourg (FR)

(72) Inventors: Yann Langlois, Viriat (FR); Laurent Pivard, Dortan (FR); Bruno Stuart Torrie, Poses (FR)

(73) Assignee: APTAR FRANCE SAS, Le Neubourg (FR)

( * ) Notice: Subject to any disclaimer, the term of this patent is extended or adjusted under 35 U.S.C. 154(b) by 74 days.

(21) Appl. No.: 18/998,579

(22) PCT Filed: Aug. 1, 2023

(86) PCT No.: PCT/FR2023/051226

§ 371 (c)(1),
(2) Date: Jan. 27, 2025

(87) PCT Pub. No.: WO2024/028554

PCT Pub. Date: Feb. 8, 2024

(65) Prior Publication Data

US 2026/0034554 A1 Feb. 5, 2026

(30) Foreign Application Priority Data

Aug. 1, 2022 (FR) ........................................ 2207970

(51) Int. Cl.
*B05B 11/10* (2023.01)

(52) U.S. Cl.
CPC ................................ *B05B 11/1084* (2023.01)

(58) Field of Classification Search
CPC .................................................... B05B 11/1084
See application file for complete search history.

(56) References Cited

U.S. PATENT DOCUMENTS 4,826,048 A * 5/1989 Skorka ................ B05B 11/1084
222/137
5,897,539 A * 4/1999 Elliesen ............ A61K 2300/00
604/289
10,384,224 B1 * 8/2019 Moignard ........... B05B 11/1047
(Continued)

FOREIGN PATENT DOCUMENTS

WO 2021/020713 A1 2/2021

OTHER PUBLICATIONS

International Preliminary Report on Patentability dated Oct. 24, 2024, issued in International Application No. PCT/FR2023/051226.
(Continued)

*Primary Examiner* — Jeremy Carroll

(74) *Attorney, Agent, or Firm* — Sughrue Mion, PLLC

(57) ABSTRACT

A dual dispenser having an outer reservoir and an inner reservoir, as well as two pumps communicating respectively with one of the reservoirs, the inner reservoir including an outer casing and an inner sleeve that extends inside the outer casing, one pump among the pumps communicating with the outer reservoir through this inner sleeve, the other pump among the pumps communicating directly with the inner reservoir. The inner sleeve and the outer casing are two separate parts, the inner sleeve defining a lower end which is in sealed contact with the outer casing, this lower end opening out directly into the outer reservoir.

11 Claims, 3 Drawing Sheets

(56) References Cited

U.S. PATENT DOCUMENTS

Figure 1:
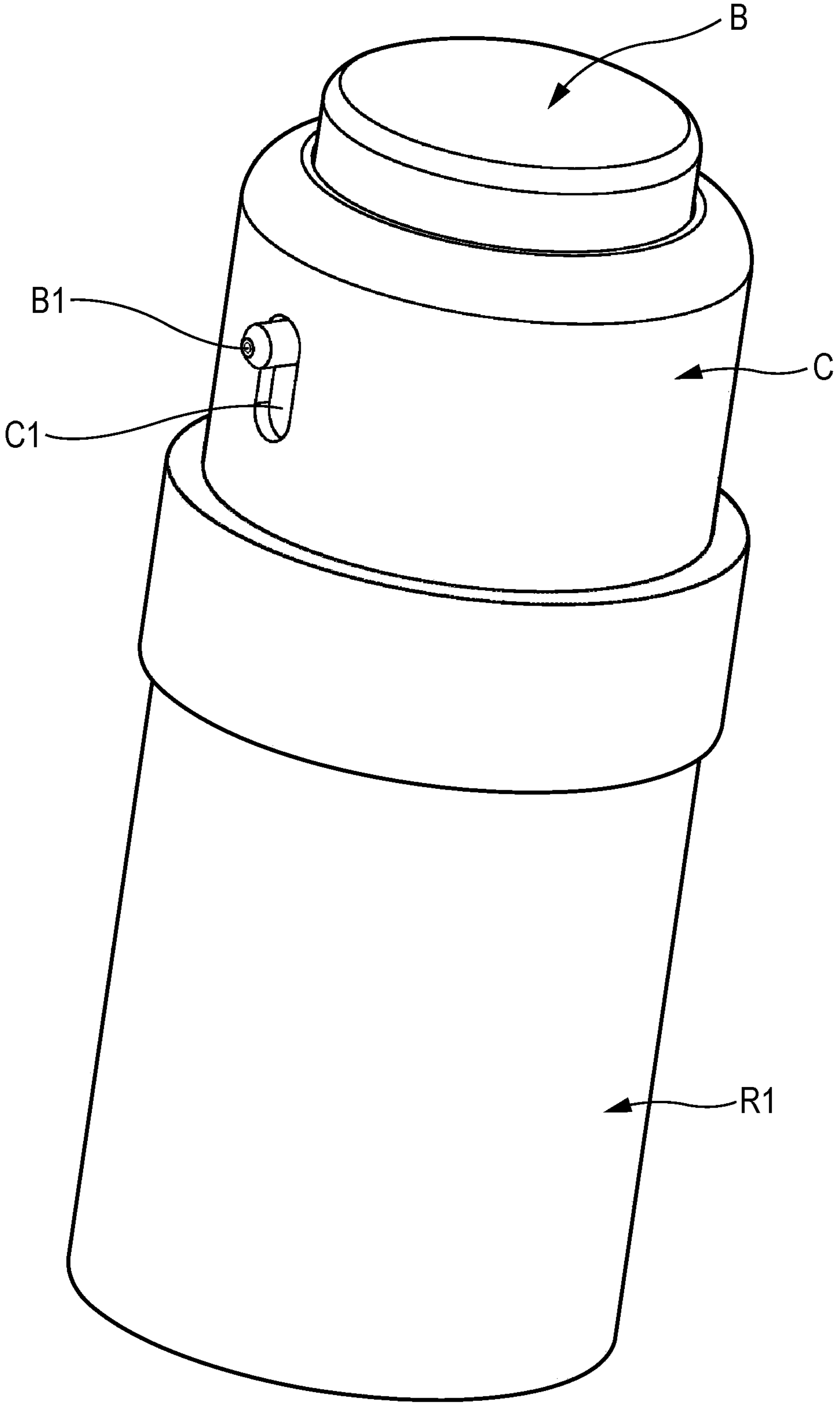

| | | | | |
|---|---|---|---|---|
| 2001/0025859 | A1 | 10/2001 | Dumont | |
| 2006/0189552 | A1* | 8/2006 | Vishnupad | A61K 8/347 514/568 |
| 2010/0044394 | A1* | 2/2010 | Milian | B05B 11/0038 222/137 |
| 2019/0255548 | A1 | 8/2019 | Moignard et al. | |
| 2019/0357656 | A1 | 11/2019 | Kang | |
| 2020/0171523 | A1 | 6/2020 | Langlois et al. | |

OTHER PUBLICATIONS

International Search Report for PCT/FR2023/051226 dated Oct. 27, 2023.

* cited by examiner

DUAL DISPENSER

CROSS REFERENCE TO RELATED APPLICATIONS

This application is a National Stage of International Application No. PCT/FR2023/051226 filed Aug. 1, 2023, claiming priority based on French Patent Application No. FR2207970 filed Aug. 1, 2022.

The present invention relates to a dual dispenser comprising two reservoirs, namely an outer reservoir and an inner reservoir, as well as two pumps communicating respectively with the reservoirs. In general, a common pushbutton allows both pumps to be operated simultaneously. The preferred field of application of the invention is that of cosmetics, but it can also apply to fields of pharmacy, household products or foodstuffs.

In the prior art, document US2001025859A1 is already known, which describes a particular type of dual dispenser comprising a single mixing pump, which takes fluid products from two nested reservoirs. More specifically, a small reservoir suspended from the pump is arranged inside a large reservoir on which the pump is mounted. The pump is provided with two dip tubes: a short one that extends into the small reservoir and a long one that extends into the large reservoir through the small reservoir. The sealing between the long dip tube and the small reservoir is not discussed in this document, but seems problematic. In addition, filling the small s technically impossible.

From the outset, the present invention differs from this prior art document in that the dual dispenser of the invention comprises two pumps, and not a single mixing pump, so that the two pumps may be standard, with different or identical doses. In addition, the present invention seeks to simplify as much as possible the operations of filling and assembling the dispenser and, in particular, the introduction of the dip tube of the pump of the outer reservoir.

Documents US2019255548A1 and US2019357656A1 are also known, which describe dual dispensers comprising two pumps with an inner reservoir arranged inside an outer reservoir. One of the pumps communicates with the outer reservoir through an inner sleeve formed by the inner reservoir, which is a one-piece part suspended in the outer reservoir. In the document US2019255548A1, the sleeve and the inner reservoir are arranged side by side, such that the volume of the inner reservoir is very limited. In document US2019357656A1, the inner reservoir surrounds the sleeve, which extends along the axis of the dispenser, such that one pump is arranged axially centrally and the other eccentrically.

These two dual dispensers have drawbacks that the present invention proposes to overcome.

To this end, the invention proposes that the inner reservoir comprises two separate parts, namely an outer reservoir and an inner sleeve that extends inside the outer reservoir, one of the pumps communicating with the outer reservoir through this inner sleeve, the other pump communicating directly with the inner reservoir. It goes without saying that the inner reservoir is arranged inside the outer reservoir. The inner sleeve defines a lower end that is in sealed contact with the outer casing, this lower end opening out directly into the outer reservoir.

Advantageously, the inner sleeve may comprise a body that ends with the lower end, which is sealingly connected in an opening of the outer casing by means of a sealing ring.

Advantageously, the body may define at its upper end a mouth, the passage section of which is much larger than that of the lower end, the body advantageously having a general funnel-shaped configuration with a progressively decreasing passage section.

Advantageously, the inner sleeve defines an inner space that communicates with the outer reservoir. It can be said that the internal space of the inner sleeve forms an extension of the outer reservoir or that it is an integral part of the outer reservoir.

Advantageously, the pump of the outer reservoir comprises a dip tube that extends through the inner sleeve into the outer reservoir. It can also be said that the dip tube protrudes beyond the inner sleeve into the outer reservoir. The dip tube dips into the fluid product of the outer reservoir, which rises in the inner sleeve. There is no sealing between the dip tube and the inner sleeve. Thus, it is easy to insert the dip tube into the inner sleeve. Furthermore, the pump may also extend inside the inner sleeve.

According to an interesting characteristic of the invention, the inner sleeve may extend off-axis or eccentrically inside the outer casing. The inner sleeve then has no rotational symmetry. This allows the dip tube to open out into the outer reservoir at the outlet of the inner sleeve centrally or axially relative to the outer reservoir, while the pump is mounted off-axis or offset. The inner sleeve forces the dip tube to bend. Advantageously, the bottom end of the inner sleeve defines a minimum passage section. The inner sleeve can then be likened to a funnel, which facilitates the insertion, guiding and passage of the dip tube into the outer reservoir. The upper end of the inner sleeve may define the maximum passage section to facilitate insertion of the free end of the dip tube. The inner sleeve may then decrease in passage section to its bottom end.

According to another characteristic, the inner sleeve may define an upper end that communicates with the outer reservoir through a pressure balancing duct, which advantageously forms an air bridge that spans the inner reservoir. In the normal position of use and storage, the upper end is not dipped in the fluid product, but surrounded by air, such that air can directly communicate between the inner sleeve and the outer reservoir to maintain the two volumes at the same pressure. More precisely, the dispenser may comprise a pump support forming two receiving housings respectively for the two pumps, one receiving housing communicating with the inner sleeve and the other receiving housing communicating with the inner reservoir, the pump support forming a main section of a pressure balancing duct, which connects the inner sleeve to the outer reservoir.

Furthermore, the dispenser may comprise a common seal that comes into sealing contact at the same time with the outer reservoir, the outer casing, and the inner sleeve. Advantageously, the common seal is compressed onto the outer reservoir, the outer casing, and the inner sleeve by the pump support.

Preferably, the outer casing is supported by the outer reservoir and the inner sleeve is supported by the outer casing.

The aim of the invention consists in extending the outer reservoir inside the inner reservoir, so that the outer reservoir extends both around and inside the inner reservoir, which may thus have an annular cross-section. This extension of the outer reservoir is formed by the internal space of the inner sleeve, which also forms the inner wall of the inner reservoir. The outer reservoir and the inner sleeve together form a kind of concentric siphon, which fluidly communicates at the lower part, but also by air at the upper part through a pressure balancing or inner venting duct. This ensures that the level of fluid product is the same in the outer reservoir and in the inner sleeve. The design of the inner sleeve in the form of a funnel or of decreasing section is advantageous for the mounting of the dip tube, which is guided by the inner sleeve until it reaches the bottom of the outer reservoir.

The invention will now be more fully described in reference to the accompanying drawings, giving as a non-limiting example, an embodiment of the invention.

Figure 2:
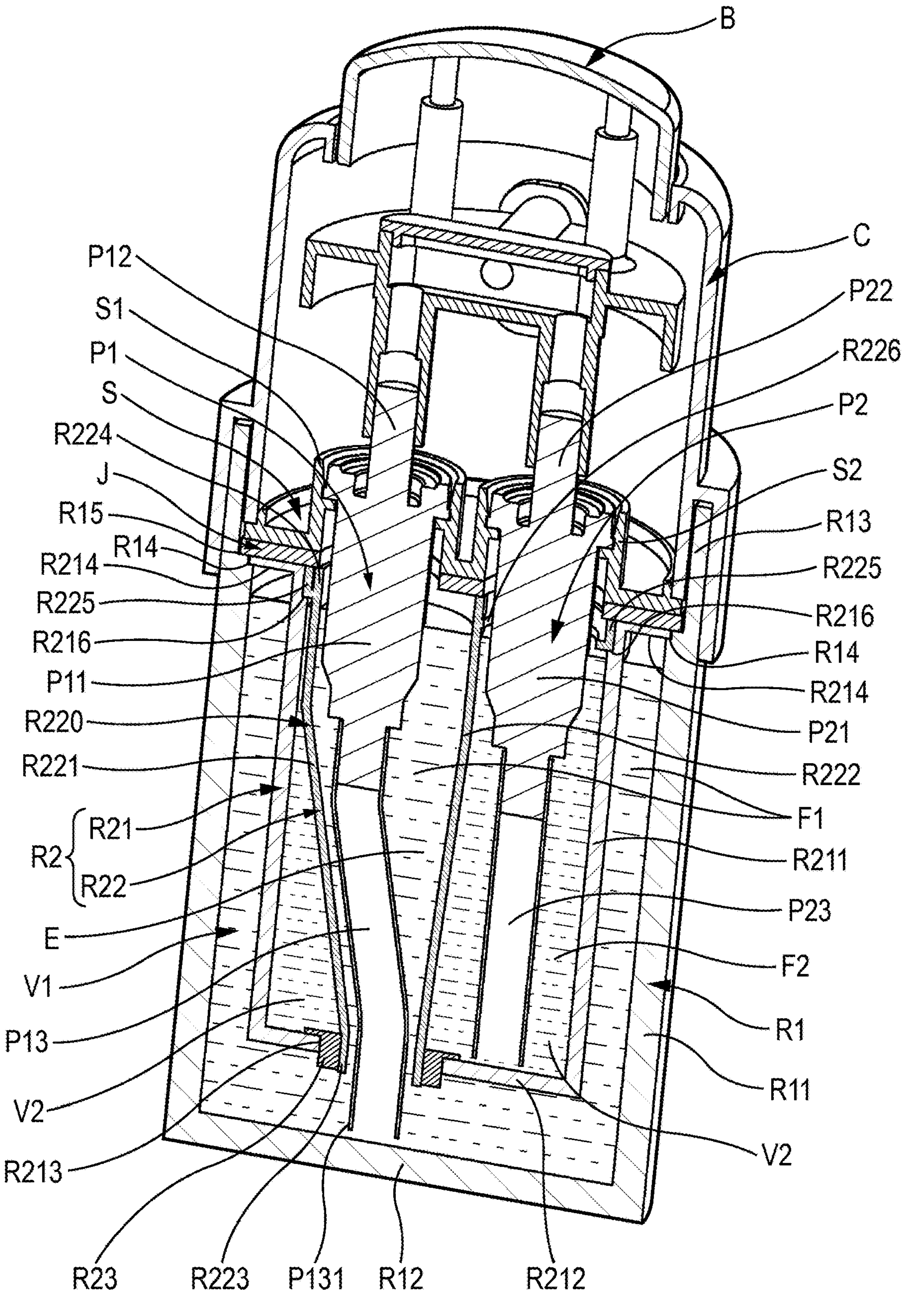
Figure 3:
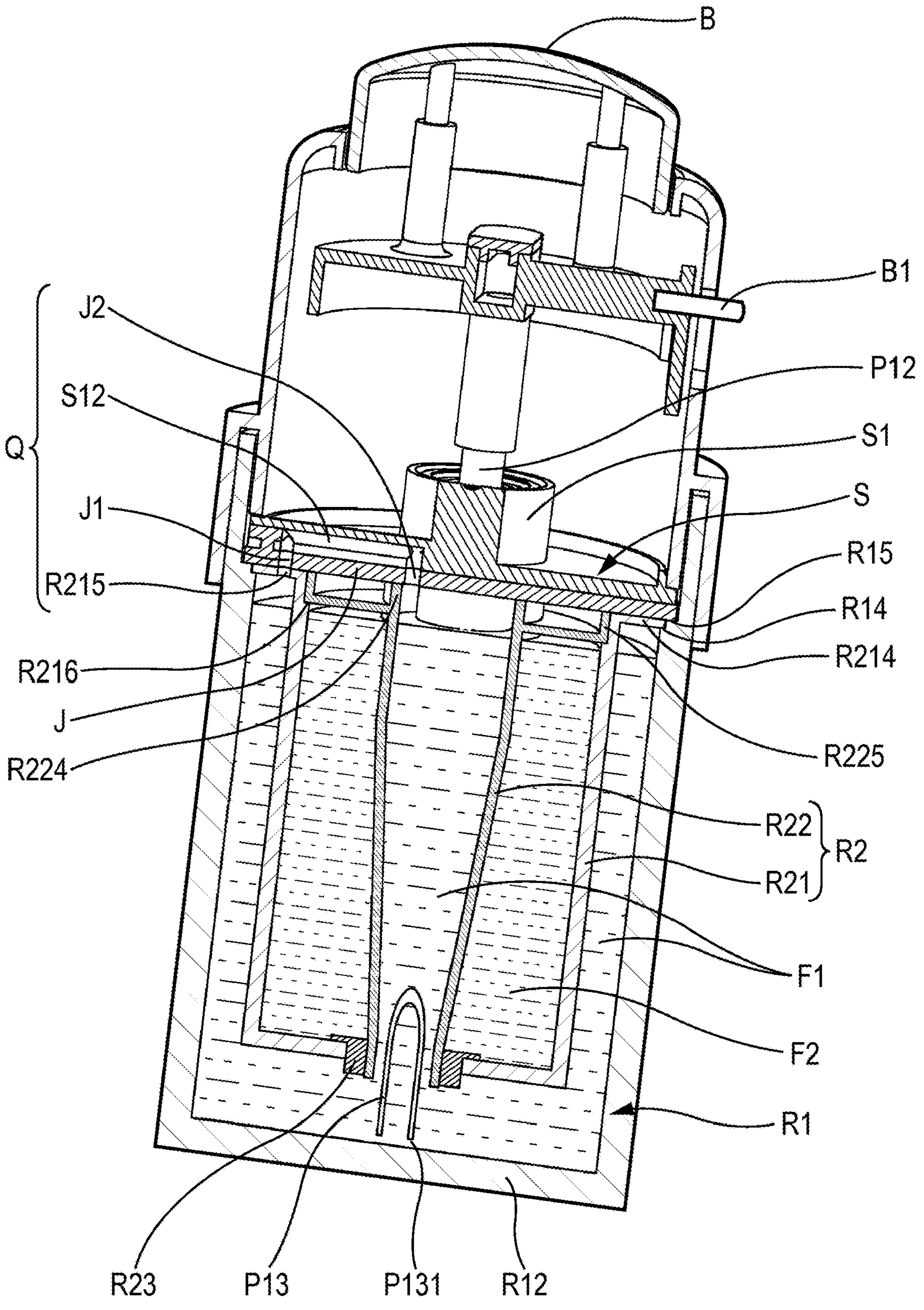

In the figures:

FIG. 1 is a perspective view of the dual dispenser according to a first embodiment of the invention, FIG. 2 is a vertical cross-sectional view through a dual dispenser of the invention, along a vertical plane through the two pumps, FIG. 3 is a view similar to that of FIG. 1 along a vertical plane perpendicular to that of FIG. 1 and passing through the plane of the venting duct.

Reference is equally made to FIGS. 1, 2 and 3 in order to describe the structure of a dual dispenser according to a non-limiting embodiment of the invention. The dual dispenser comprises two reservoirs arranged one inside the other, namely an outer reservoir R1 and an inner reservoir R2.

The outer reservoir R1 may be in the form of a shell comprising a side wall R11 of generally cylindrical shape, a bottom R12 allowing the dispenser to be held upright and a neck R13, optionally provided with latching means. The neck R13 connects the side wall by two inner shoulders R14 and R15, which are arranged in concentric steps. Their functions will be given below. The outer reservoir R1 can advantageously be made out of a transparent material, in order to reveal its contents.

The inner reservoir R2 is disposed inside the outer reservoir R1. The reservoir R2 comprises an outer casing R21 and an inner sleeve R22 that extends within the outer casing R21. The outer reservoir R21 comprises a barrel R211 of generally cylindrical shape, which is extended by a bottom R212 forming a central opening R213. At its top end, the outer casing R21 forms an annular collar R214 that rests on the inner shoulder R14 of the outer reservoir R1. The barrel R211 forms an inner shoulder R216 in the vicinity of the annular collar R214. The inner shoulder R14, the annular collar R214 and the inner shoulder R216 may be circular. The barrel R211 and the bottom R212 extend inside the outer reservoir R1 with a distance separating them, so as to form a bucket-shaped useful volume V1. The inner sleeve R22 comprises a body R220 that ends with a lower end R222, which is sealingly connected in the opening R213 by means of a sealing ring R23. At its top end, the body R220 defines a mouth R224, the passage section of which is much larger than that of the bottom end R222. The body R220 thus presents a general funnel-shaped configuration with a progressively decreasing passage section. In FIG. 2, it can be seen that the body R220 defines two opposite walls R221 and R222, which are different: the wall R222 is straight and vertical, while the wall R221 is first straight and vertical from the mouth R224, then oblique and straight again at the lower end R222. In FIG. 3, it can be seen that the opposite walls of the body R220 are symmetrical and have a configuration similar to the wall R221, but with a less inclined oblique section. It should be noted that the mouthpiece R224 is arranged eccentrically, off-axis or offset inside the neck R214. However, the lower end R222 is disposed in a perfectly axial or centered manner, such that the body R220 extends in an off-axis manner inside the outer reservoir R21. More precisely, the inner sleeve R22 also defines a bearing ring R225, which extends around the mouth R224, but eccentrically. The bearing ring R225 forms an area, which extends in the shape of a crescent moon around the mouth R224. This area forms a passage opening R226, which gives direct access to the inner reservoir R2. The bearing ring R225 rests on the inner shoulder R216 of the outer casing R21. FIG. 2 shows the mouth R224 and the passage opening R226 side by side. FIG. 3 shows the mouth R224 centered in the bearing ring R225. The bearing ring R225 may be circular, but the mouth R224 may have any shape, geometrical or not.

Thus, the outer casing R21 and the inner sleeve R22 define between them a useful volume V2. The sleeve R22, or more precisely its body R220, also defines an internal space E that communicates with the useful volume V1 through the lower end R222 of the inner sleeve R22. The outer reservoir R1 thus defines a total useful volume that corresponds to the sum of the useful volume V1 and the internal space E. In other words, it can be said that the useful volume V1 of the outer reservoir R1 is extended inside the inner sleeve R21 that defines the internal space E. As can be seen in the figures, the useful volume V1 and the internal space E are initially filled with a first fluid product F1, which therefore, also extends both around and inside the inner reservoir R2. As for this inner reservoir R2, it is initially filled with a second fluid product F2, which may be identical to the fluid product F1, or preferably different.

Filling reservoirs R1 and R2 is extremely simple. By way of example, the reservoir R1 may be half-filled and the reservoir R2 may then be introduced into the partially-filled reservoir R1. It is then sufficient to fill the reservoir R2. Alternatively, it is possible to fill the reservoir R1 through the inner sleeve R22, then the reservoir R2.

The dual dispenser of the invention also comprises two pumps P1 and P2, the pump P1 being associated with the inner reservoir R1 and the pump P2 being associated with the inner reservoir R2. The pumps P1 and P2 may be identical, or preferably different, particularly with regard to their doses.

The design of the pumps P1 and P2 not being critical for the present invention, it will therefore, not be described in detail. However, it can be said that each pump P1, P2 comprises a pump body P11, P21, in which an actuation rod P12, P22 is axially movable back and forth. The pumps P1, P2 also each comprise a dip tube P13, P23: the dip tube P13 extending inside the inner sleeve R22 and defines a lower end that is located close to the bottom R12 of the outer reservoir R1. As for the dip tube P23, it extends straight into the inner reservoir R2 until it is close to the bottom R212.

It should be noted that the dip tube P13 is slightly bent, because of the off-axis design of the inner sleeve R21, so as to position the lower end of the dip tube P13 substantially axially or centrally relative to the bottom R12 of the outer reservoir R1. The design of the funnel-shaped inner sleeve R21 makes it easy to engage the bottom end of the dip tube P13 through the mouth R224. The shrinking body R220 then guides the dip tube P13 toward the lower end R223 and beyond into the outer reservoir R1. In fact, it can be noted in FIG. 1 that the pump P1 is offset relative to the lower end R223 so that the dip tube P13 must undergo deflection following the funnel shape of the inner sleeve R21.

The dual dispenser of the invention also comprises a pump support S that defines two reception housings S1 and S2 for the pumps P1 and P2 respectively. By way of example, the pump bodies P11 and P21 may be received by snap-fastening in the receiving housings S1 and S2. The pump P1 can extend inside the mouth R224 of the inner sleeve R22 and the pump P2 can extend inside the outer casing R21 by passing through the passage opening R226 of the bearing ring R225.

In order to guarantee the sealing of the reservoirs, a neck seal J is also provided, which is compressed on the inner shoulder R15 of the outer reservoir R1, on the annular collar R214 of the outer reservoir R21, on the upper edge of the mouth R224 and on the bearing ring R225 of the inner sleeve R22. The compression of this neck seal J is ensured by the pump support S.

As can be seen in FIG. 3, the dual distributor also defines a pressure balancing duct Q that communicates the internal space E of the inner sleeve R22 with the useful volume V1 of the outer reservoir R1. The upper part of the reservoirs is not filled with fluid, but with air. Thus, the pressure balancing duct Q makes it possible to communicate the air between the inner sleeve R22 and the outer reservoir R1, so that the pressure is always identical in these two spaces. As a result, the level of the fluid product F1 in the internal space E and in the useful volume V1 is identical. In greater detail, the pressure balancing duct Q comprises a main section S12, which extends horizontally through the support S, as well as two vertical sections J1 and J2, which are formed through the seal J. One of the vertical sections J1 extends through the annular collar R214 at R215. The pressure balancing duct Q forms a kind of air bridge that spans the inner reservoir R2. This can be seen in FIG. 3.

It can thus be said, that the internal space E communicates with the useful volume V1 both at the lower part through the end R222 and at the upper part through the pressure balancing duct S12.

The pump support S is mounted on the neck R13 of the outer reservoir R1 by means of a cap C that engages both the pump support S and the neck R13. Finally, the two actuation rods P12 and P22 are capped by a common pushbutton B, which defines a common outlet orifice B1. Alternatively, it is also possible to provide two separate outlet orifices, one for the pump P1 and the other for the pump P2. The pushbutton B is guided axially inside the cap C and the common outlet orifice B1 moves axially through a window C1 of the cap C, as can be seen in FIG. 1. From the outside, the dual dispenser only reveals the outer reservoir R1, the cap C, the pushbutton B and the common outlet orifice B1. When the outer reservoir R1 is transparent, the outer casing R21 of the inner reservoir R2 can also be seen.

The inner reservoir R2 here is made by the sealed assembly of two parts, namely the outer casing R21 and the inner sleeve R22. This two-piece embodiment is explained by the fact that the inner sleeve R22 has a complex shape devoid of axis of symmetry. However, it is possible to imagine other embodiments, in which the body R220 of the inner sleeve R21 has an axial symmetry, so as to be cylindrical. In this case, it could be envisaged to produce the outer casing R21 and the inner sleeve R22 as a single piece.

In this embodiment, the dip tube P13 is fitted to the inlet of the pump P1. Without moving away from the scope of the invention, it is also possible to imagine that the dip tube P13 could be made in a single piece or integral with the internal sleeve R22. In this case, the pump P1 would be sleeved, when mounted on the pump support S, in an endpiece formed at the inlet of the dip tube.

In this embodiment, the outer casing R21 extends axially or centrally inside the reservoir R1. Without moving away from the scope of the invention, it is possible to imagine other shapes that are less symmetrical or central for the outer casing R21.

The invention thus provides a dual dispenser, the outer reservoir of which extends or is prolonged inside the inner reservoir. The inner sleeve thus defines a makeup reservoir for the outer reservoir and also makes it possible to receive the pump P1 in an off-axis manner while arranging the lower end P131 of the dip tube P13 in a central axial manner.

The invention claimed is:

1. A dual dispenser comprising an outer reservoir and an inner reservoir, as well as two pumps communicating respectively with one of the reservoirs, the inner reservoir comprising an outer casing and an inner sleeve that extends inside the outer casing, one pump among the pumps communicating with the outer reservoir through this inner sleeve, the pump of the outer reservoir comprises a dip tube that extends through the inner sleeve into the outer reservoir, the other pump among the pumps communicating directly with the inner reservoir, wherein the inner sleeve and the outer casing are two separate parts, the inner sleeve defining a lower end which is in sealed contact with the outer casing, this lower end opening out directly into the outer reservoir, thus allowing the dip tube to open out into the outer reservoir at the outlet of the inner sleeve centrally with respect to the outer reservoir, while the pump is mounted off-axis, the inner sleeve forcing the dip tube to bend.

2. The dual dispenser according to claim 1, wherein the inner sleeve comprises a body which ends with the lower end, which is connected in a sealed manner in an opening of the outer casing by means of a sealing ring.

3. The dual dispenser according to claim 1, wherein the lower end defines a minimum passage section.

4. The dual dispenser according to claim 1, wherein the inner sleeve extends in an off-axis manner inside the outer casing.

5. The dual dispenser according to claim 1, wherein the body defines at its upper end a mouth, the passage section of which is much larger than that of the lower end, the body advantageously having a general funnel-shaped configuration with a progressively decreasing passage section.

6. The dual dispenser according to claim 1, wherein the inner sleeve defines an upper end that communicates with the outer reservoir through a pressure balancing conduit.

7. The dual dispenser according to claim 1, wherein the pressure balancing duct forms an air bridge that spans the inner reservoir.

8. The dual dispenser according to claim 1, comprising a pump support forming two reception housings respectively for the two pumps, one reception housing communicating with the inner sleeve and the other reception housing communicating with the inner reservoir, the pump support forming a main section of a pressure balancing duct, which connects the inner sleeve to the inner reservoir.

9. The dual dispenser according to claim 1, including a common seal that comes into contact at the same time, with the outer reservoir, the outer casing, and the inner sleeve.

10. The dual dispenser according to claim 9, wherein the common seal is compressed on the outer reservoir, the outer casing and the inner sleeve by the pump support.

11. The dual dispenser according to claim 1, wherein the outer casing is supported by the outer reservoir and the inner sleeve is supported by the outer casing.

* * * * *